United States Patent
Arimilli et al.

(10) Patent No.: US 6,374,330 B1
(45) Date of Patent: Apr. 16, 2002

(54) CACHE-COHERENCY PROTOCOL WITH UPSTREAM UNDEFINED STATE

(75) Inventors: Ravi Kumar Arimilli, Austin; John Steven Dodson, Pflugerville; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/839,545

(22) Filed: Apr. 14, 1997

(51) Int. Cl.$^7$ .............................................. G06F 12/00
(52) U.S. Cl. ..................... 711/141; 711/117; 711/122; 711/133
(58) Field of Search ............................... 711/144, 122, 711/114, 117, 143, 133; 395/471

(56) References Cited

U.S. PATENT DOCUMENTS

| | | | | | |
|---|---|---|---|---|---|
| 5,369,753 A | * | 11/1994 | Tipley | .......................... | 711/122 |
| 5,577,227 A | * | 11/1996 | Finnell et al. | ............... | 711/122 |
| 5,623,632 A | * | 4/1997 | Liu et al. | ..................... | 711/144 |
| 5,671,391 A | * | 9/1997 | Knotts | .......................... | 711/143 |
| 5,715,428 A | * | 2/1998 | Wang et al. | ................. | 711/141 |
| 5,737,751 A | * | 4/1998 | Patel et al. | .................. | 711/133 |
| 5,740,400 A | * | 4/1998 | Bowles | ........................ | 711/144 |
| 5,778,422 A | * | 7/1998 | Genduso et al. | ............ | 711/117 |
| 5,787,469 A | * | 7/1998 | Merrell | ........................ | 711/122 |
| 5,796,980 A | * | 8/1998 | Bowles | ........................ | 395/471 |

* cited by examiner

Primary Examiner—Matthew M. Kim
Assistant Examiner—Fred F. Tzeng
(74) Attorney, Agent, or Firm—Mark E. McBurney; Bracewell & Patterson, L.L.P.

(57) ABSTRACT

A method of maintaining cache-coherency in a multi-processor computer system provides new states to indicate that a sector in an upstream cache has been modified, without executing unnecessary bus transactions for the lower-level cache(s). These new "U" states can indicate which sector in the cache line was modified, or if the cache line was the subject of a cachable write-through operation. The protocol is implemented as an improvement to the prior-art "MESI" cache-coherency protocol. The new protocol is especially useful in handling allocate-and-zero instructions wherein data is modified in the cache (zeroed out) without first fetching the old data from memory. In the embodiment wherein there are only two sectors in a given cache line, three new states are provided to indicate which sector was modified, or whether any cachable write-through operation was performed on the cache line of the first-level cache.

17 Claims, 2 Drawing Sheets

CACHE-COHERENCY PROTOCOL WITH UPSTREAM UNDEFINED STATE

BACKGROUND OF THE INVENTION

1. Field of the Invention

The present invention generally relates to computer systems, and more particularly to a cache-coherency protocol which determines whether a snoop operation is required to be forwarded upstream to a higher-level cache.

2. Description of the Related Art

The basic structure of a conventional multi-processor computer system 10 is shown in FIG. 1. Computer system 10 has several processing units, two of which, 12a and 12b, are depicted, which are connected to various peripheral devices, including input/output (I/O) devices 14 (such as a display monitor, keyboard, graphical pointer (mouse), and a permanent storage device (hard disk)), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct memory-access channels (not shown). Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. The computer can also have more than two processing units.

In a symmetric multi-processor (SMP) computer, all of the processing units are generally identical; that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corporation. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In an SMP computer, it is important to provide a coherent memory system, that is, to cause writes to each individual memory location to be serialized in some order for all processors. For example, assume a location in memory is modified by a sequence of write operations to take on the values: 1, 2, 3, 4. In a cache-coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent." Virtually all coherency protocols operate only to the granularity of the size of a cache block. That is to say, the coherency protocol controls the movement of and write permissions for data on a cache block basis and not separately for each individual memory location.

There are a number of protocols and techniques for achieving cache coherence that are known to those skilled in the art. At the heart of all these mechanisms for maintaining coherency is the requirement that the protocols allow only one processor to have a "permission" that allows a write to a given memory location (cache block) at any given point in time. As a consequence of this requirement, whenever a processing element attempts to write to a memory location, it must first inform all other processing elements of its desire to write the location and receive permission from all other processing elements to carry out the write. The key issue is that all other processors in the system must be informed of the write by the initiating processor before the write occurs. Furthermore, if a block is present in the L1 cache of a given processing unit, it is also present in the L2 and L3 caches of that processing unit. This property is known as inclusion and is well-known to those skilled in the art. Henceforth, it is assumed that the principle of inclusion applies to the caches related to the present invention.

To implement cache coherency in a system, the processors communicate over a common generalized interconnect (i.e., bus 20). The processors pass messages over the interconnect indicating their desire to read or write memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one of more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels if present, e.g., the L3 cache. If the block is not present in the lower-level caches, the request is then presented on the generalized interconnect (20) to be serviced. Once an operation has been placed on the generalized interconnect, all other processing units snoop the operation and determine if the block is present in their caches. If a given processing unit has the block of data requested by processing unit in its L1 cache and that data is modified, by the principle of inclusion, the L2 cache and any lower-level caches also have copies of the block (however, their copies may be stale, since the copy in the processor's cache is modified). Therefore, when the lowest-level cache (e.g., L3) of the processing unit snoops the read operation, it will determine that the block requested is present and modified in a higher-level cache. When this occurs, the L3 cache places a message on the generalized interconnect informing the processing unit that it must "retry" its operation again at a later time, because the actual value of the memory location is in the L1 cache at the top of the memory hierarchy and must be retrieved to make it available to service the read request of the initiating processing unit.

Once the request from processing unit has been retried, the L3 cache begins a process to retrieve the modified data from the L1 cache and make it available at the L3 cache, main memory or both, depending on the exact details of the implementation which are not specifically relevant to this invention. To retrieve the block from the higher-level caches, the L3 cache sends messages through the inter-cache connections to the higher-level caches, requesting that the block be retrieved. These messages propagate up the processing unit hierarchy until they reach the L1 cache and cause the block to be moved down the hierarchy to the lowest-level (the L3 cache or main memory) to be able to service the request from the initiating processing unit.

The initiating processing unit eventually represents the read request on the generalized interconnect. At this point, however, the modified data has been retrieved from the L1 cache of a processing unit and the read request from the initiating processor will be satisfied. The scenario just described is commonly referred to as a "snoop push." A read request is snooped on the generalized interconnect which causes the processing unit to "push" the block to the bottom of the hierarchy to satisfy the read request made by the initiating processing unit.

The key point to note is that when a processor wishes to read or write a block, it must communicate that desire with the other processing units in the system in order to maintain cache coherence. To achieve this, the cache coherence protocol associates with each block in each level of the cache hierarchy, status indicators indicating the current "state" of the block. The state information is used to allow certain optimizations in the coherency protocol that reduce message traffic on the generalized interconnect and the inter-cache connections. As one example of this mechanism, when a processing unit executes a read, it receives a message indicating whether or not the read must be retried later. If the read operation is not retried, the message usually also includes information allowing the processing unit to determine if any other processing unit also has a still active copy of the block (this is accomplished by having the other lowest-level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive." If a block is marked exclusive, it is permissible to allow the processing unit to later write the block without first communicating with other processing units in the system because no other processing unit has a copy of the block. Therefore, in general, it is possible for a processor to read or write a location without first communicating this intention onto the interconnection. However, this only occurs in cases where the coherency protocol has ensured that no other processor has an interest in the block.

The foregoing cache-coherency technique is implemented in a specific protocol referred to as "MESI," and is illustrated in FIG. 2. In this protocol, a cache block can be in one of four states, "M" (Modified), "E" (Exclusive), "S" (Shared) or "I" (Invalid). Under the MESI protocol, each cache entry (e.g., a 32-byte sector) has two bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified data has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a sector is invalid, it indicates that the addressed sector is not resident in the cache. As seen in FIG. 2, if a sector is in any of the Modified, Shared or Invalid states, it can move between the states depending upon the particular bus transaction. While a sector in an Exclusive state can move to any other state, a sector can only become Exclusive if it is first Invalid.

One of the difficulties of maintaining SMP performance as processor speeds improve is the increased load on the system memory bus. One way to lessen that impact is to increase the width of the bus and the amount of data transferred with each transaction (the "transfer burst size"). Unfortunately, this transfer size becomes the cache line size and coherency size for the system and impacts the software model if it has cache-controlling instructions, as most reduced instruction set computing (RISC) processors do. In order to prevent impacting the software, a sectored cache is implemented between the processor and the system bus. The sectored cache has a line size equal to the memory and system transfer size, with a sector size equal to the processor cache line size. This construction solves the software impact problem, but raises several design issues for the lower-level cache which is trying to maintain inclusivity and coherency.

First, whenever the higher-level cache (L1) executes a particular instruction referred to as an allocate-and-zero instruction ("DCBZ" in the PowerPC™ instruction set), it is modifying data in its cache (zeroing it) without first fetching the old data from memory. This operation is commonly performed when reallocating memory areas to a new process. The lower-level cache also needs to allocate and zero its cache line, but it has a larger cache line. The conventional method of implementing this procedure is to read the larger line from memory and then zero out the portion corresponding to the processor cache line. This approach, however, defeats the entire purpose of the operation which is to avoid reading data from memory that is going to be reallocated anyway. Furthermore, it is likely that the processor will, in a very short time span, allocate-and-zero additional cache lines which would fall into the remaining portion of the larger cache line in the lower-level cache (although the lower-level cache cannot assume this is the case). So the first problem is keeping track of sectors that are valid in the higher-level (e.g., L1) cache but are not yet valid in lower-level caches (e.g., L2 or L3).

A second problem is how to efficiently support cachable write-through operations, which are commonly used by, e.g., graphic device drivers (such as for a video display monitor). A large amount of data is often referenced in this case, but only a small amount is modified. The modified data is required to be visible to the graphics device outside of the processor in a timely manner, so the cachable write-through protocol is used. This protocol requires allocating the line containing the modified data in all levels of caches to maintain inclusion, but complicates the implementation due to the write-through operation which would require partial line-write capability (an expensive and complicated feature) to keep the caches consistent, or flushing and invalidating the line when it is written, which would negatively impact performance since the line needs to be fetched again the next time it is referenced.

It would, therefore, be desirable to devise a method of indicating that a cache line is allocated and valid upstream of a given cache level, while undefined at that level, in order to avoid unnecessary bus operations. It would be further advantageous if the method could efficiently handle the rare cases where a snoop hit occurs against such an upstream modified sector.

SUMMARY OF THE INVENTION

It is therefore one object of the present invention to provide an improved method of maintaining cache coherency in a multi-processor computer system having sectored lower-level caches.

It is another object of the present invention to provide such a method that improves performance of zero allocation operations on cache lines.

It is yet another object of the present invention to provide such a method that additionally supports write-through cache operations without providing a complicated partial-write capability.

The foregoing objects are achieved in a method of maintaining cache coherency in a multi-processor computer system, generally comprising the steps of loading a first value into a cache line block in a first-level cache of a processing unit, and into a sector of a cache line in a second-level cache of the processing unit, then modifying the value in the cache line block in the first-level cache of the processing unit, and indicating at the second-level cache that the sector of the cache line in the second-level cache has been modified upstream. This indication is made without modifying the sector of the cache line in the second-level cache. This procedure can be performed in response to an allocate-and-zero (DCBZ) instruction which zeros out the cache line block of the first cache level of the processing unit. The indicating step includes an indication of which sector in a plurality of sectors in the cache line in the second-level cache corresponds to the cache line block in the first-level cache that was modified. In the embodiment wherein there are only two sectors in a given cache line, three new states are provided to indicate which sector was modified, or whether any cachable write-through operation was performed on the cache line of the first-level cache.

With this new protocol, sectors that are valid in higher levels may be properly tracked without executing unnecessary bus operations, and cachable write-through operations are more efficiently supported.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
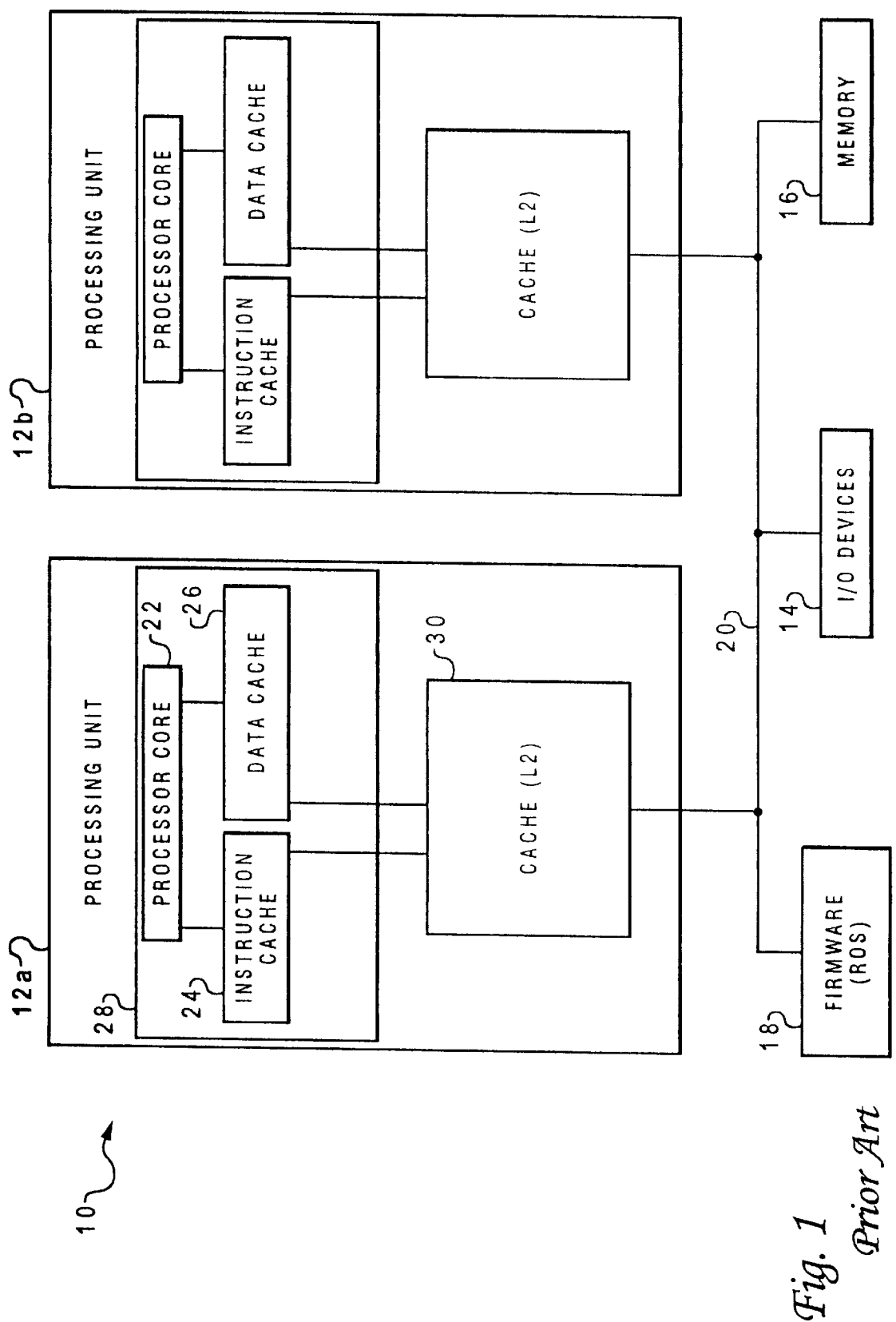
FIG. 1 is a block diagram of a prior-art multi-processor computer system.

The present invention is directed to a method of maintaining cache coherency in a multi-processor system, such as the system of FIG. 1, but the present invention could be applied to computer systems that are not necessarily conventional, i.e., they could include new hardware components not shown in FIG. 1, or have a novel interconnection architecture for existing components. Therefore, those skilled in the art will appreciate that the present invention is not limited to the generalized system shown in that figure.

Figure 3:
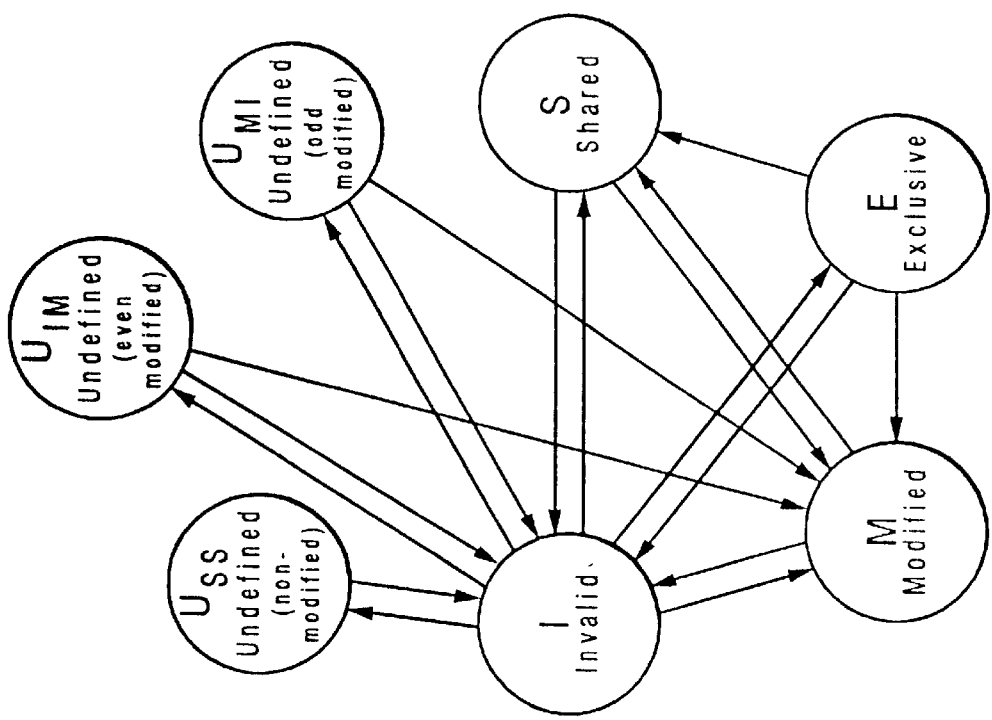
FIG. 3 is a state diagram depicting the cache-coherency protocol of the present invention.
Figure 2:
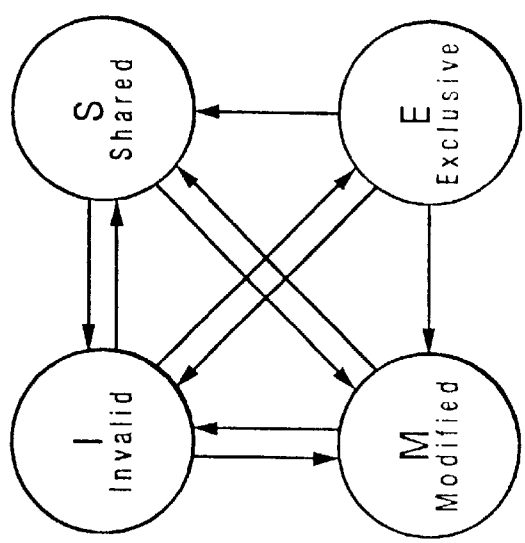
FIG. 2 is a state diagram depicting a prior art cache-coherency protocol (MESI)

With reference now to FIG. 3, there is depicted a state diagram of one embodiment of the cache-coherency protocol of the present invention. This protocol is similar to the prior art MESI protocol of FIG. 2, in that it includes the same four states (Modified, Exclusive, Shared and Invalid), but also includes three new "U" states, for upstream, undefined sector, as explained further below; this new protocol is referred to herein as the "U-MESI" protocol. As with the prior art protocol, the four M-E-S-I states may change based on the initial state of the entry and the type of access sought by the requesting processor. The manner in which these four states change is generally identical to the prior art MESI protocol, with the exceptions noted below.

In the depicted embodiment, the U-MESI protocol is adapted for a cache having cache lines with two sectors. In this embodiment, there are three "U" states due to the three possible cases wherein: (1) the first of the two sectors (the "odd" sector) is modified; (2) the second of the two sectors (the "even" sector) is modified; and (3) neither of the sectors is modified (they are both shared as a result of a cachable write-through operation). The first of these states is referred to herein as "$U_{IM}$," while the second of these states is referred to herein as "$U_{MI}$," and the third state is referred to herein as "$U_{SS}$." In this implementation of the U-MESI protocol, each cache entry now has three bits which indicate the state of the entry, out of the seven possible states (the four prior-art states, and the three new "U" states). If more than two sectors were provided in a cache line, then additional "U" states would be required (and additional bits in the cache entry).

Table 1 shows the cache transitions involving the highest level (L1) operations:

TABLE 1

|   | Highest Level (L1) Operation | Lower Level cache transition |
|---|---|---|
| 1 | DCBZ--even sector | I → $U_{IM}$ |
| 2 | DCBZ--odd sector | I → $U_{MI}$ |
| 3 | DCBZ--even sector | $U_{MI}$ → M |
| 4 | DCBZ--odd sector | $U_{IM}$ → M |
| 5 | Read/RWITM | $U_{MI}|U_{IM}$ → I |
| 6 | Any L1 "hit" | $U_{SS}$ → $U_{SS}$ |
| 7 | Cachable write-through | I → $U_{SS}$ |
| 8 | Any other operation | normal MESI |

In the first of the entries in Table 1, when a DCBZ operation (which is a write-type operation) is performed on an even sector (the second sector) in the cache line of the L1 cache, any corresponding lower-level caches in the "I" (Invalid) state will undergo a transition to "$U_{IM}$," i.e., only the second sector is noted as being modified. In the second entry in Table 1, when a DCBZ operation is performed on an odd sector (the first sector) in the cache line of the L1 cache, any corresponding lower-level caches in the "I" (Invalid) state will undergo a transition "$U_{MI}$," i.e., only the first sector is noted as being modified.

If a DCBZ operation is performed on an even sector when the odd sector of the same line has previously undergone a DCBZ operation and the corresponding lower-level caches are in the "$U_{MI}$" state (the third entry in Table 1), or if a DCBZ operation is performed on an odd sector when the even sector of the same line has previously undergone a DCBZ operation and the corresponding lower-level caches are in the "$U_{IM}$" state (the fourth entry in Table 1), then the lower-level caches will undergo a state transition to the "M" (Modified) state to indicate that the entire line is modified. If, however, only one DCBZ operation has previously occurred for a given line and the lower-level caches have that line at a "$U_{IM}$" or "$U_{MI}$," state, and the other (Invalid) line is the subject of a "read" or "read with intent to modify" (RWITM) operation, then the lower-level cache lines go to "I" (Invalid), and the modified sector (M-sector) is flushed from the higher-level cache.

In the sixth entry of Table 1, if an L1 "hit" occurs against the subject block, and the lower-level caches are in the "$U_{SS}$" state, they will remain in that state, i.e., it is treated as if it were invalid, but not cached. If a cachable/write-through read operation is performed on the block (the seventh entry in Table 1), and the lower-level caches have the corresponding block in an "I" (Invalid) state, then they undergo a transition to the "$U_{SS}$" state. Finally, as noted in entry eight of Table 1, all other L1 operations not specified above undergo a normal transition, i.e., according to the prior-art MESI protocol.

Table 2 shows how system bus snooped transactions will influence the caches in the "U" states:

TABLE 2

|   | Bus operation | Snooper state | Coherency response |
|---|---|---|---|
| 1 | Any snoop "hit" | $U_{IM}$ → I | Retry |
| 2 | Any snoop "hit" | $U_{MI}$ → I | Retry |
| 3 | Non-read snoop "hit" | $U_{SS}$ → I | Retry |
| 4 | Read snoop "hit" | $U_{SS}$ → $U_{SS}$ | Shared |

In the "U" states, the cache knows it must take action but must forward the snoop upstream to determine the proper action. Table 2 shows only those rare cases where a snoop hit occurs against one of the "U" states. In these situations, the lower-level cache will flush the contents of the upstream cache and move to the "I" (Invalid) state, and issue a "Retry" response, except where a read snoop hit occurs against a "$U_{SS}$" state, in which the coherency response is "Shared."

With the foregoing U-MESI protocol, both of the problems mentioned above are solved, i.e., keeping track of sectors that are valid in higher levels without executing unnecessary bus operations, and efficiently supporting cachable write-through operations. The results are increased memory bandwidth and the freeing up of address bandwidth, as well as byte-write capability.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of maintaining cache coherency in a multi-processor computer system having a plurality of processing units, each processing unit having a cache hierarchy including at least first- and second-level caches, wherein the first cache level is upstream of the second cache level, the method comprising the steps of:

loading a first value into a cache line block in a first-level cache of a processing unit, and into a sector of a cache line in a second-level cache of the processing unit, wherein the cache line in the second-level cache is comprised of a plurality of sectors corresponding to separate cache line blocks in the first-level cache;

modifying the value in the cache line block in the first-level cache of the processing unit; and indicating at the second-level cache that the sector of the cache line in the second level cache has been modified at an upstream cache without modifying the sector of the cache line in the second-level cache.

2. The method of claim 1 wherein said modifying step zeros out the cache line block of the first-level cache of the processing unit.

3. The method of claim 1 further comprising loading at least one other value into another cache line block of the first-level cache that corresponds to the sector of the cache line in the second-level cache.

4. The method of claim 1 further comprising the step of responding to an inquiry from a second processing unit regarding a request to access a memory block corresponding to the first value.

5. The method of claim 1 wherein said indicating step includes an indication of which sector in a plurality of sectors in the cache line in the second-level cache corresponds to the cache line block in the first-level cache that was modified.

6. The method of claim 5 comprising the further step of indicating that the cache line of the first-level cache is invalid in response to an attempt to access the upstream modified cache line.

7. The method of claim 7 wherein said indicating step includes an indication of any cachable write-through operation performed on the cache line of the first-level cache.

8. The method of claim 1 wherein a cache line in the second-level cache has only two sectors, and said indicating step includes an indication of which of the two sectors corresponds to the cache line block in the first-level cache that was modified.

9. The method of claim 8 comprising the further step of indicating that the cache line of the first-level cache is invalid in response to an attempt to access the upstream modified cache line.

10. The method of claim 1 wherein said indicating step includes an indication of any cachable write-through operation performed on the cache line of the first-level cache.

11. A computer system comprising:

a memory device;

a bus connected to said memory device; and a plurality of processing units connected to said bus, each processing unit having at least a first-level cache and a second-level cache, each of said caches having a plurality of cache lines, and each of said cache lines in said second-level cache having a plurality of sectors, wherein the sectors respectively correspond to separate cache line blocks in the first-level cache, said processing units each further having means for providing an indication of when a given sector of a given cache line in said second-level caches has been modified at an upstream cache without modifying said given sector.

12. The computer system of claim 11 wherein each said processing unit further responds to an inquiry from another processing unit regarding a request to access a memory block corresponding to said given sector by forwarding said indication.

13. The computer system of claim 11 wherein:

each said cache line in said first-level cache has a plurality of sectors; and each said cache line in said second-level cache has a larger number of sectors than each said cache line in said first-level cache.

14. The computer system of claim 11 wherein said means for providing said indication includes means for indicating which sector in said plurality of sectors in said cache line in said second-level cache corresponds to a block in said first-level cache that was modified.

15. The computer system of claim 11 wherein said means for providing said indication further includes means for indicating when any cachable write-through operation is performed on a cache line of said first-level cache.

16. The computer system of claim 11 wherein said means for providing said indication further includes means for indicating that a cache line of said first-level cache, corresponding to said given cache line of said second-level cache, is invalid in response to an attempt to access said cache line of said first-level cache.

17. The computer system of claim 16 wherein said means for providing said indication further includes means for indicating when any cachable write-through operation is performed on said cache line of said first-level cache.

* * * * *